Patented June 17, 1952

2,600,684

UNITED STATES PATENT OFFICE 2,600,684

HYDROLYZED COPOLYMERS OF FLUORINATED VINYL COMPOUNDS

Frank G. Pearson, Bryn Mawr, Pa., assignor to American Viscose Corporation, Wilmington, Del., a corporation of Delaware No Drawing. Application February 2, 1950, Serial No. 142,095

5 Claims. (Cl. 260—87.1)

This invention relates to the production of new synthetic resin materials having valuable properties that make them especially useful in coating, adhesive and laminating applications, and also in the production of shaped masses by molding, casting and extruding, especially of filaments and fibers for textile applications. This application is a continuation-in-part of my copending applications Serial No. 496,588, filed July 29, 1943, now abandoned, and Serial No. 746,882, filed May 8, 1947, which in turn is a continuation-in-part of Serial No. 509,761, filed November 10, 1943, now abandoned.

Linear polymers containing halogen substituents only are extremely hydrophobic and filaments made from them are also of this character. Fabrics made therefrom have the serious disadvantage of not being capable of absorbing moisture from the body of the wearer, which gives rise to a feeling of discomfort to the wearer, especially in warm or hot weather. In addition, the failure to pick up or retain small but appreciable amounts of water greatly hampers the ability of the fabrics made therefrom to recover from any distortions produced during wear.

It is an object of this invention to produce novel halogen-containing copolymers which have improved properties adapting them especially for the production of filaments and fabrics having improved characteristics, and particularly a controllable hydrophilic character, so that the above-mentioned disadvantages are substantially overcome or greatly reduced.

The invention is more particularly concerned with partially to completely hydrolyzed copolymers of vinyl esters of straight chain aliphatic acids having 1 to 18 carbon atoms in the chain with monomeric compounds having the formula $RR'C=CFCl$ in which R and R' are selected from the group consisting of hydrogen and fluorine atoms and are either the same or different, and compositions comprising such copolymers. Examples of vinyl esters within the scope of the present invention are vinyl acetate, vinyl propionate, vinyl laurate, vinyl chloracetate and the like.

The copolymers to be hydrolyzed may be obtained by reacting the mixed monomers at temperatures ranging from room temperature to about 50° C., either by subjecting the mixed monomers to ultraviolet light or by allowing the monomers to stand (with or without exposure to ultraviolet light) at the desired temperature in the presence of a suitable catalyst, such as an organic or inorganic peroxygen compound, benzoyl peroxide being a representative catalyst. Polymerization may be effected in bulk or in solution in a suitable solvent, such as acetone. Copolymerization is quite rapid and may be completed in periods of from five to eight hours, though longer periods may be necessary in certain circumstances. Alternatively, the monomers may be emulsified in water with 1 to 5% of a suitable emulsifying agent, such as a higher fatty alcohol sulfate, an alkyl aryl sulfonate, or a sulfonated higher alkyl diester of an aliphatic dicarboxylic acid. By controlling the proportions of the monomers and the conditions of copolymerization, the proportion of available hydrolyzable groups in the product may be predetermined to provide copolymers containing from 1% to 99% by weight of hydrolyzable monomeric units.

The copolymers may be hydrolyzed by dissolving them in suitable solvents, such as acetone, chloroform and dioxane, and then introducing the solution into an acid medium which is preferably anhydrous and may be a solvent or precipitant for the hydrolyzed copolymer obtained. The medium may be made acid by dissolving dry hydrogen chloride therein. The hydrolysis may be carried out at room temperature or at lower or higher temperatures such as from 0° C. to 50° C. or at the boiling point of the solvent used. The time may be varied from a mere matter of a few seconds to five minutes up to one to sixteen hours or more depending upon the particular copolymer undergoing hydrolysis. Copolymers of vinylidene chlorofluoride with vinyl acetate hydrolyze rapidly even at room temperature and partial hydrolysis may be obtained by employing lower temperatures between about 0° C. to 10° C. where the reaction rate is slowed down so that any degree of partial deacylation can be obtained merely by removing the partially hydrolyzed copolymer from the acid medium.

The following examples are illustrative of the invention:

Example 1

Twenty parts by weight of vinylidene chlorofluoride in liquid form were introduced into a pressure vessel transparent to ultraviolet light containing 50 parts by weight of vinyl laurate, ½ part by weight of benzoyl peroxide, and ½ part by weight of tetraethyl lead. After sealing the vessel, it was exposed to ultraviolet light and agitated until complete disappearance of the liquid phase. The copolymer obtained was a waxy mass. The copolymer was dissolved in dioxane to produce a 10% solution by weight and agitated with an equal volume of methanol saturated with dry hydrogen chloride at a temperature of 40° C. for one hour. The laurate groups were 80% removed and the product was found to be dispersible in water. It was applied in an aqueous medium to spun rayon yarns in a conventional slasher. The yarns thus dressed were woven and knitted into fabrics which were subsequently dyed and scoured. Weaving and knitting were accomplished with excellent results and the size on the yarns did not interfere in any way with the uniformity and depth of penetration by the dye.

*Example 2*

Into 100 parts by volume of water in a sealed container, there were introduced 20 parts by volume of vinylidene chlorofluoride, 20 parts by volume of vinyl acetate, about 1% of a catalyst made up of equal parts of benzoyl peroxide and tetraethyl lead, and about 3% by weight of Duponol (a higher fatty alcohol sulfate). The sealed container was agitated for one week. The white powder obtained was a copolymer in which three mols of vinyl acetate were combined to every mol of vinylidene chlorofluoride. This copolymer softened at about 95 to 100° C. and became a viscous melt at 155 to 160° C. It was soluble in acetone. It was insoluble in ethyl alcohol and ether but swelled in dioxane, chloroform and benzene.

The copolymer produced was formed into filaments by extrusion through spinneret orifices of the heat-softened polymer at about 155 to 160° C. Clear, colorless, strong and flexible filaments were thus obtained. The strength and flexibility were found to be increased by increasing the amount of stretch applied during the extrusion or after the formation and setting of the filaments, the filaments in the latter case being rendered soft by heat or the application of a solvent. Filaments were also spun by wet and dry spinning, using acetone as the solvent.

This copolymer was deacetylated by pouring a 5% solution of the copolymer in acetone as a fine stream with rapid stirring into excess methanol which had been saturated with HCl gas at room temperature. The hydrolyzed polymer precipitated immediately and was removed by filtration and then dried. The resulting copolymer had a softening point between 65 and 70° C., but, surprisingly, did not become sufficiently plastic for the formation of filaments by extrusion until a temperature of about 175 to 180° C. was reached. The deacetylated copolymer was soluble in acetone and was insoluble in alcohol.

A mass of the deacetylated copolymer was fused at 177° C. and was then extruded to form filaments. The deacetylated copolymer was also dissolved in acetone and converted into filaments by dry spinning and by wet spinning.

*Example 3*

A mixture of 30 parts by volume trifluorochloroethylene, 3 parts by volume of vinyl acetate, and about 1.5% by weight of a mixture of equal amounts of lead tetraethyl and benzoyl peroxide was formed in a suitable vessel transparent to ultraviolet light and in which the mixture was held under pressure to maintain the monomers in the liquid condition. The contents were subjected to ultraviolet light at room temperature and were suitably shaken until the complete disappearance of the liquid phase.

The product thus obtained was soluble in acetone, chloroform, butanone; was insoluble in alcohol and ether; and was swelled by dioxane. The product begins to soften about 120° C. and as the temperature is raised it becomes more plastic but never really melts. Up to 250° C. there are no signs of decomposition. The copolymer had a degree of polymerization of about 400 and the ratio of the vinyl acetate monomer to the trifluorochloroethylene monomer in the copolymer was 1:4. The copolymer was dissolved in chloroform to form a 6.25% solution by weight. This solution was then allowed to run in a fine stream, with vigorous stirring, into 250 cc. of a saturated solution of hydrogen chloride in a mixture of 75% chloroform—25% methyl alcohol by volume.

The slightly turbid mixture was then refluxed for one hour and allowed to stand for sixteen hours at room temperature. The polymer was recovered by precipitation in 1.5 liters of isopropanol. It was removed by filtration and dried in vacuo. By this procedure, 20% of the available acetate groups were removed. Fibers extruded of this material and subsequently stretched were thermoplastic and did not shrink when subjected to temperatures up to the boiling point of water.

*Example 4*

A mixture of 11.3 parts by volume of trifluorochloroethylene and 3.7 parts by volume of vinyl acetate and 40 parts by volume of an aqueous solution containing 3% by weight of Gardinol WA (sodium lauryl sulfate) and 0.01% by weight of uranyl acetate was sealed in a vessel transparent to ultraviolet light. The contents of the tube were continuously agitated and subjected to ultraviolet light at room temperature for 163 hours. A 67.5% yield was obtained of a product having a softening temperature of 80° C. and a melting temperature of 175° C. The product contained 27 mol per cent vinyl acetate and the remainder of trifluorochloroethylene. The copolymer was deacylated in the same manner as recited in Example 3. About 23% of the available acetate groups were thereby removed.

*Example 5*

The copolymerization procedure of Example 3 was followed with a mixture of 30 parts by volume of trifluorochloroethylene and 5 parts by volume of vinyl acetate using only 1% by weight of the catalyst mixture. The product which was soluble in chloroform, soluble to the extent of about 20% by weight in acetone, but insoluble in methanol and isopropanol, contained 33.1 mol percent of vinyl acetate and was found to string on a hot plate at a temperature of 115° C. It formed colorless extensible filaments which developed orientation along the fiber axis upon stretching. The copolymer was deacylated in the same manner as recited in Example 3. 25% of the available acetate groups were thereby removed. The product which had solubility characteristics similar to that of the parent copolymer became tacky at 140° C., had a string-point of 200° C. and was free of any discoloration up to 300° C. The filaments formed by stringing showed no shrinkage during subjection to boiling water for two minutes.

*Example 6*

The copolymerization procedure of Example 3 was followed with a mixture of 30 parts by volume of trifluorochloroethylene, 6 parts by volume of vinyl acetate, and 1% of the catalyst mixture, exposure to ultraviolet light being effected for a period of 84 hours. The product was a copolymer containing 36 mol percent of vinyl acetate which softens at 80° C. and strings at 125° C. The copolymer was deacylated as in Example 3 except that it was refluxed throughout the entire period of 17 hours. The product was completely deacetylated by this procedure.

*Example 7*

A mixture of trifluorochloroethylene and vinyl acetate in 1:1 molar ratio was subjected to the copolymerization procedure of Example 3 in the presence of 1% of the mixed catalyst. The product contained 56.5 mol percent of vinyl acetate and had a shrinkage temperature of 52° C. and a melting point of 102° C. It was soluble in acetone and chloroform but insoluble in ethanol. Filaments were formed from the copolymer and were capable of being oriented by drawing in the cold or at temperatures up to about 40° C. Stretched filaments were deacylated by submerging them with agitation in anhydrous ethanol saturated with dry hydrogen chloride at 45° C. for a period of four hours. Then the filaments were removed, washed with ethanol and dried. The shrinkage temperature was thereby elevated to about 65° C.

*Example 8*

A copolymer containing 10 mol percent of vinyl acetate and produced as described above in Example 3, except that only 1 part of vinyl acetate was used for 30 parts of trifluorochloroethylene, was extruded in fused condition at temperatures of 190° to 200° C. into filaments of small diameter. By subjecting the filaments to stretching during extrusion or by after-stretching the formed and set filaments, for which purpose they were rendered soft either by heat or solvent-action, the filaments are improved in flexibility and tensile strength and exhibit molecular orientation. The filaments had a shrinkage temperature of about 110° C. Stretched filaments were deacylated by submerging them in anhydrous ethyl alcohol saturated with dry hydrogen chloride. After refluxing four hours, the filaments were removed, washed with alcohol and dried. The shrinkage temperature was thereby elevated to above 120° C.

*Example 9*

A copolymer containing 5 mol percent of vinyl acetate and produced as in Example 3 except that only 1 part by volume of vinyl acetate was used for 60 parts by volume of trifluorochloroethylene was extruded in fused condition at temperatures of 200 to 220° C. into small diameter filaments. After stretching as in Example 8, the filaments showed no shrinkage up to 110° C. The stretched filaments were deacylated as in Example 8 with proportionate elevation of the shrinkage temperature.

*Example 10*

A copolymer containing 12 mol percent of vinyl acetate and produced as in Example 1 except that only 1.2 parts by volume of vinyl acetate were used for 30 parts by volume of trifluorochloroethylene was extruded in fused condition at temperatures of 185 to 195° C. into filaments. After stretching as in Example 6, the filaments showed no shrinkage up to 105° C. The stretched filaments were deacylated as in Example 8 with proportionate elevation of the shrinkage temperature.

*Example 11*

A copolymer containing 79.6 mol percent of vinyl acetate and produced as in Example 7 except that the molar ratio of 3:1 existed between the vinyl acetate and trifluorochloroethylene in the starting mixture was subjected to hydrolysis as in Example 5 until 50% of the available acetate groups were replaced by hydroxyl. The resulting product showed no evidence of any shrinkage, softening or tackiness up to 160° C. A 10% (by weight) solution of the product in a mixture of 75% chloroform and 25% methyl alcohol by volume was spun into an aqueous isopropanol coagulating bath to form filaments.

Hydrolyzed copolymers of trifluorochloroethylene containing from 30 to 80 mol percent of vinyl acetate are especially advantageous in that by hydrolysis, either completely or partially, as in Example 5, materials are obtained which have shrinkage points and melting points well above 100° C. and moisture-retention characteristics which can be preselected by control of the extent of hydrolysis.

All of the hydrolyzed copolymers of the present invention are remarkably resistant to decomposition by heat and light. The most heat-sensitive of them show no discoloration until a temperature of 250° C. is reached and some of them give no sign of decomoposition even at temperatures of 300° to 320° C. This characteristic places the decomposition point far above the melting point of the hydrolyzed copolymers so that molding can be readily performed even without incorporation of heat stabilizers. The hydrolyzed products obtained from copolymers having in the range of 5 to 12 mol percent vinyl acetate have the best chemical resistance and are non-inflammable.

In general, the hydrolyzed copolymers of the invention may be formed directly into filaments by melt-spinning through spinneret orifices. To facilitate such spinning, there may be added plasticizers, heat stabilizers, lubricants and the like.

Besides converting the copolymers into filaments by melt-spinning, they may be dissolved in suitable solvents and either wet or dry spun into the form of filaments. In addition, films and molded articles of any desired shape may be produced from the copolymers by utilization of their thermoplasticity or by using a solution thereof in the solvents mentioned above. The filaments, films or other structures may be formed with or without admixture of pigments, fillers, plasticizers and other resins.

The filaments formed of a large proportion of vinyl ester, e. g. 70 to 80% and the remainder of halogen-containing units and in which no more than 50% of the ester units are hydrolyzed are useful in forming fabrics adapted for filtering oils. More completely hydrolyzed copolymers of the composition just mentioned, such as those in which 80% or more of the ester groups are replaced by hydroxyl groups can be formed into water-dispersible filaments which can be combined in the form of short fibers or continuous filaments with fibers or filaments of other materials, such as polymers of acrylonitrile or vinyl chloride or copolymers thereof with each other or with, up to 15 or 25% in the copolymer, such monomers as vinyl acetate, N-vinyl carbazole, 2-vinyl pyridine, vinylidene chloride, vinylidene chlorofluoride, trifluorochloroethylene, and the like, which are not readily amenable to textile processing because of their extreme hydrophobicity and tendency to develop static charges, or other reasons, such as low strength. The combination of the highly hydrolyzed copolymers of the present invention with the other filamentary materials improves textile processing. Depending on the ultimate use of the fabric, woven, knitted or braided, the hydrolyzed copolymers may be removed, such as by scouring, or allowed to remain. If desired, the new filaments or fibers may be converted into spun or continuous filament yarns, cords or other strand forms and then combined with the other filamentary material, such as with yarns, cords or other strands thereof previous to conversion to fabrics.

All of the filaments of the present invention having at least 20% of halogen-containing components have thermoplasticity and can be rendered tacky by heating fabrics, yarns, or cords thereof to set their structure by fiber-to-fiber autogenous adhesion without destruction of their fiber form, and fiber bonding can be obtained by heating fabrics which contain up to 75 or 85 percent of other non-adhesive fibers.

The hydrolyzed copolymers may be further modified by reaction with aldehydes such as formaldehyde, acetaldehyde, crotonaldehyde, or polymers thereof, such as trioxymethylene or metaldehyde, in the presence of acid catalysts such as aluminum chloride, zinc chloride, sodium bisulfate, sulfuric acid, hydrochloric acid and the like. The resulting acetals can be converted into shaped transparent masses, such as filaments, films, tubes, rods, or the like by extrusion, molding, or other procedure. Many of them are also useful as coating and textile sizing compositions.

Solutions of the deacylated copolymers may be made, such as in acetone, chloroform, and the like and used for coating surfaces of wood, paper, textiles, glass and metal, and for sizing, dressing, and setting twist in yarns, tire cords, fabrics and the like.

It is to be understood that changes and variations may be made without departing from the spirit and scope of the invention as defined by the appended claims.

I claim:

1. A material comprising a deacetylated copolymer of vinylidene chlorofluoride and vinyl acetate having a softening point of about 65 to 70° C.

2. A material comprising a copolymer whose component units comprise vinylidene chlorofluoride, vinyl alcohol, and an ester component having the formula $HCH=HCOOCR$ where R is a straight chain alkyl group having 1 to 18 carbon atoms, the copolymer being derived by hydrolyzing a copolymer containing from 1 to 99 percent by weight of ester component and the remainder of the vinylidene chlorofluoride.

3. A material comprising a copolymer whose monomeric constituents comprise vinylidene chlorofluoride, vinyl alcohol, and an ester component having the formula $HCH=HCOOCR$ where R is a straight chain alkyl group having 1 to 18 carbon atoms, the copolymer being derived by hydrolyzing a copolymer containing from 5 to 80 mol percent of ester component and the remainder of the vinylidene chlorofluoride.

4. A material as defined in claim 3 in which the ester component is vinyl laurate.

5. A material as defined in claim 3 in which the ester component is vinyl acetate.

FRANK G. PEARSON.

REFERENCES CITED

The following references are of record in the file of this patent:

FOREIGN PATENTS

| Number | Country | Date |
|---|---|---|
| 596,943 | Great Britain | Jan. 14, 1948 |